(12) United States Patent
Hawley et al.

(10) Patent No.: US 10,109,004 B1
(45) Date of Patent: Oct. 23, 2018

(54) ASSORTMENT PACK PLANNING

(71) Applicant: Target Brands, Inc., Minneapolis, MN (US)

(72) Inventors: Megan L. Hawley, Minneapolis, MN (US); Hong Yang Singhania, Prior Lake, MN (US); Madhu Tangudu, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 594 days.

(21) Appl. No.: 14/720,386

(22) Filed: May 22, 2015

(51) Int. Cl.
 *G06Q 10/08* (2012.01)
 *G06Q 10/06* (2012.01)
 *G06Q 30/06* (2012.01)

(52) U.S. Cl.
 CPC ..... *G06Q 30/0635* (2013.01); *G06Q 10/0637* (2013.01); *G06Q 10/06375* (2013.01); *G06Q 10/087* (2013.01)

(58) Field of Classification Search
 None
 See application file for complete search history.

(56) References Cited

U.S. PATENT DOCUMENTS

| | | | |
|---|---|---|---|
| 6,611,732 B2 * | 8/2003 | Okamura | G06Q 10/08 700/225 |
| 7,006,981 B2 | 2/2006 | Rose et al. | |
| 7,257,544 B2 | 8/2007 | Rose et al. | |
| 8,370,185 B2 | 2/2013 | Fotteler et al. | |
| 8,392,231 B2 | 3/2013 | Fotteler et al. | |
| 8,688,497 B2 * | 4/2014 | McMains | G06Q 10/087 705/7.11 |
| 8,788,315 B2 * | 7/2014 | McMains | G06Q 10/06315 705/7.12 |
| 8,812,338 B2 * | 8/2014 | Pratt | G06Q 10/063 414/902 |
| 2001/0027356 A1 * | 10/2001 | Okamura | G06Q 10/08 700/226 |
| 2005/0197872 A1 | 9/2005 | Fotteler et al. | |
| 2006/0149634 A1 | 7/2006 | Pelegrin et al. | |
| 2009/0271241 A1 * | 10/2009 | Pratt | G05B 15/02 705/7.11 |

(Continued)

OTHER PUBLICATIONS

Office Action from U.S. Appl. No. 13/676,842, dated Sep. 30, 2015, 50 pages (Continued)

*Primary Examiner* — Nicholas D Rosen
(74) *Attorney, Agent, or Firm* — Shumaker & Sieffert, P.A.

(57) ABSTRACT

A computing device determines the contents of one or more assortment packs for an online distribution center ("DC") based on pre-defined store assortment packs. The computing device selects a group of store assortment packs that fulfill the requirements of an online distribution center for a first set of items that are offered for sale at both the retail stores and the online store. The computing device may further identify a second set of items that are not offered for sale at the retail stores, such as "online only" items, and which therefore are not included within any of the store assortment packs. The computing device optimizes the contents of the selected group of store assortment packs to ensure that the second set of items can be fit into the selected group of store assortment packs.

16 Claims, 7 Drawing Sheets

(56) References Cited

U.S. PATENT DOCUMENTS

| | | | |
|---|---|---|---|
| 2009/0319401 A1* | 12/2009 | Rao | G06Q 10/087 705/29 |
| 2010/0222916 A1 | 9/2010 | Drenth | |
| 2011/0238459 A1 | 9/2011 | Bottom | |
| 2012/0179505 A1 | 7/2012 | McMains et al. | |
| 2012/0179507 A1* | 7/2012 | McMains | G06Q 10/06315 705/7.25 |
| 2014/0058781 A1* | 2/2014 | Padmanabhan | G06Q 10/06312 705/7.22 |
| 2014/0136271 A1 | 5/2014 | Rangarajan et al. | |

OTHER PUBLICATIONS

Response to the Office Action dated Sep. 30, 2015 from U.S. Appl. No. 13/676,842, filed Jan. 29, 2016, 20 pages.

Final Office Action from U.S. Appl. No. 13/676,842, dated May 5, 2016, 8 pages.

Vaidyanathan, "Retail Demand Management: Forecasting, Assortment Planning and Pricing, A Dissertation," University of Pennsylvania, 2011, 183 pp. Applicant points out, in accordance with MPEP 309.04(a), that the year of publication, 2011, is sufficiently earlier than the effective U.S. filing date, May 22, 2015, so that the particular month of publication is not in issue.

Fisher et al., "An Algorithm and Demand Estimation Procedure for Retail Assortment Optimization", OPIM Department, The Wharton School, Retrieved from http://faculty.chicagobooth.edu/workshops/omscience/archive/pdf/ap_13_jan_09.pdf, Jan. 2009, 49 pgs.

Cachon et al., "Category Management and Coordination in Retail Assortment Planning in the Presence of Basket Shopping Consumers", Management Science, vol. 53, No. 6, Jun. 2007, pp. 934-951, Retrieved from http://opim-sun.wharton.upenn.edu/~cachon/pdf/cmv2.pdf, 18 pgs.

"SAS Intelligent Clustering for Retail", SAS Institute Inc., 2010, Retrieved on Apr. 17, 2012 from http://www.sas.com/resources/factsheet/sas-intelligent-clustering-for-retail-fact-sheet.pdf, 4 pgs.

Fisher et al., "Accurate Retail Testing of Fashion Merchandise: Methodology and Application", Marketing Science, vol. 19, No. 3, Summer 2000, 13 pgs.

"Clustering to Improve Merchandise Allocation, Testing, and Forecasting: An Application of the K-Medians Algorithm", Operations Research: Quantitative and Applied Economics, Feb. 27, 2011, Retrieved on Apr. 18, 2012 from http://espin086.wordpress.com/category/operations-research/, 16 pgs.

Shuang Chen, "Optimization Models for Service and Delivery Planning", University of Florida, Aug. 2011, 128 pgs.

"The Cluster Procedure: Clustering Methods", SAS/STAT 9.2 User's Guide, Second Edition, Nov. 20, 2014, Retrieved from http://support.sas.com/documentation/cdl/en/statug/63033/HTML/default/viewer.htm, 6 pgs.

Canadian Office Action from CA Patent application No. 2,798,887, dated Sep. 10, 2014, 6 pgs.

Canadian Office Action from CA Patent application No. 2,798,887, dated Oct. 18, 2013, 6 pgs.

Canadian Office Action from CA Patent application No. 2,798,887, dated May 24, 2013, 5 pgs.

Prosecution History from U.S. Appl. No. 13/676,842, dated Dec. 9, 2014 through May 15, 2015, 103 pgs.

U.S. Appl. No. 13/676,842, filed Nov. 14, 2012 by Bharath Rangarajan et al.

* cited by examiner

ASSORTMENT PACK PLANNING

BACKGROUND

Retailers may sell goods to customers through multiple channels of distribution. Large retail chains may include hundreds or thousands individual brick-and-mortar stores located across the country and, in certain examples, the world. Such chains may also operate an e-commerce business, through which customers may purchase items online. The e-commerce business may offer many of the same items provided at the brick-and-mortar stores, as well as additional "online only" items.

The retailer may request (i.e., order) various versions of an item from a vendor based on forecasted sales of the item at each of the retail stores. For example, the retailer may order a t-shirt in several different sizes and different colors, where the forecasted sales of each size and color may be different at each retail store. Likewise, the retailer may order these same versions of the item for their online business, as well as additional online only versions. In the t-shirt example, the online site may offer additional colors and/or sizes not available in the brick-and-mortar stores.

The vendors ship the items to the individual brick-and-mortar retail stores and to one or more online distribution centers using assortment packs. In general, the assortment shipped to any individual retail store, or to the online distribution centers, should match the anticipated demand at that store or distribution center as closely as possible. For large retail chains that operate hundreds or thousands of brick-and-mortar stores as well as a large online business, and that offer hundreds or thousands of different products, assortment pack planning is a complex technical problem.

SUMMARY

This disclosure relates to techniques for determining the contents of assortment packs to be sent to online distribution centers.

In one example, a method includes storing, by a storage device, data regarding a plurality of pre-defined store assortment packs, each store assortment pack containing a unique distribution of items offered for sale at one or more retail stores, identifying, by the computing device, a first set of items required by an online distribution center that can be fulfilled using one or more of the store assortment packs, selecting, by the computing device, a group of the store assortment packs that fulfill the requirements of the online distribution center for the first set of items, identifying, by the computing device, a second set of items required by the online distribution center that cannot be fulfilled using one or more store assortment packs, determining, by the computing device, whether the second set of items can be fit into the selected group of store assortment packs, in response to determining that the second set of items can be fit into the selected group of store assortment packs, optimizing, by the computing device, the distribution of items within the selected group of store assortment packs to include the second set of items to arrive at an optimized set of distribution center assortment packs, and generating, by the computing device, a notification regarding the optimized set of distribution center assortment packs.

The method may further include, in response to determining that the second set of items cannot be fit into the selected group of store assortment packs, decreasing, by the computing device, a number of the selected group of store assortment packs by one to determine a current number of store assortment packs, and selecting, by the computing device, a group of store assortment packs that fulfill the distribution center requirements for the first set of items based on the current number of store assortment packs.

The method may further include, in response to determining that the second set of items cannot be fit into the selected group of store assortment packs, increasing, by the computing device, a number of DC only assortment packs by one, and determining, by the computing device, whether the second set of items can be fit into the current number of the selected group of store assortment packs and the current number of DC only assortment packs.

In another example, the disclosure is directed to a computing system comprising at least one storage device that stores data regarding a plurality of pre-defined store assortment packs, each store assortment pack containing a unique distribution of items offered for sale at one or more retail stores, and at least one processor configured to identify a first set of items required by an online distribution center that can be fulfilled using one or more of the store assortment packs, select a group of the store assortment packs that fulfill the requirements of the online distribution center for the first set of items, identify a second set of items required by the online distribution center that cannot be fulfilled using one or more store assortment packs; determine whether the second set of items can be fit into the selected group of store assortment packs; in response to determining that the second set of items can be fit into the selected group of store assortment packs, optimize the distribution of items within the selected group of store assortment packs to include the second set of items to arrive at an optimized set of distribution center assortment packs, and generate a notification regarding the optimized set of distribution center assortment packs.

In another example, the disclosure is directed to a non-transitory computer-readable storage medium storing instructions that, when executed, cause at least one processor of a computing device to identify a first set of items required by an online distribution center that can be fulfilled using one or more store assortment packs, each of the one or more store assortment packs containing a unique distribution of items offered for sale at one or more retail stores, select a group of the store assortment packs that fulfill the requirements of the online distribution center for the first set of items, identify a second set of items required by the online distribution center that cannot be fulfilled using one or more store assortment packs, determine whether the second set of items can be fit into the selected group of store assortment packs, in response to determining that the second set of items can be fit into the selected group of store assortment packs, optimize the distribution of items within the selected group of store assortment packs to include the second set of items to arrive at an optimized set of distribution center assortment packs, and generate a notification regarding the optimized set of distribution center assortment packs.

The details of one or more examples of the disclosure are set forth in the accompanying drawings and the description below. Other features and advantages will be apparent from the description and drawings, and from the claims.

DETAILED DESCRIPTION

Figure 1:
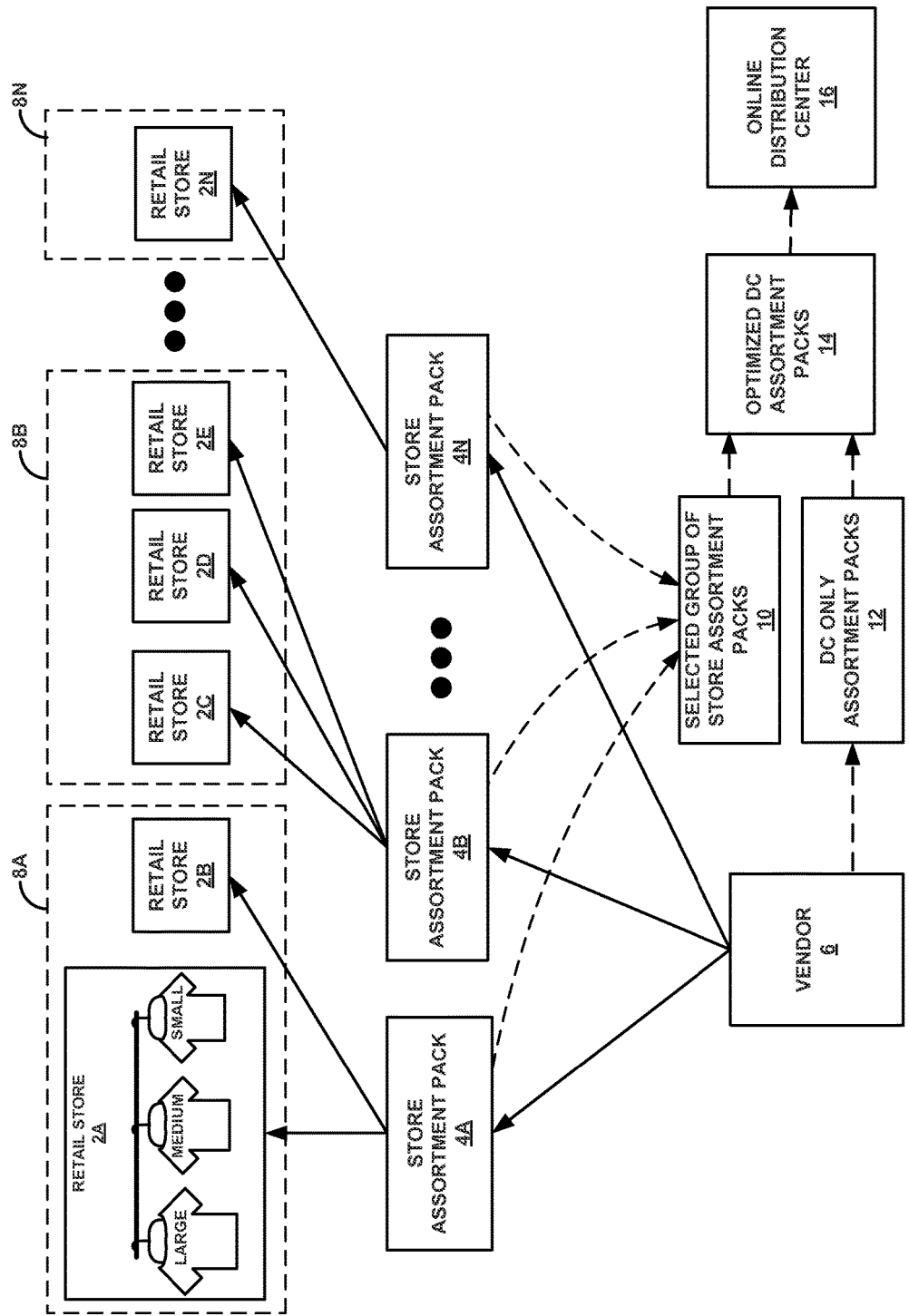
FIG. 1 is a conceptual diagram illustrating an example retail environment, including a plurality of retail stores and an online distribution center, in which the assortment pack planning techniques of the present disclosure may be used.

In general, aspects of this disclosure are directed to techniques for determining the number and contents of assortment packs for online distribution centers based on pre-defined store assortment packs.

A retail chain may be a business entity that operates multiple traditional brick-and-mortar retail store locations, as well as an e-commerce (online) based business. The e-commerce business may offer many of the same items provided at the brick-and-mortar stores, as well as additional "online only" items. The retail chain may order the items from a vendor to be shipped directly to each individual retail store as well as to one or more online distribution centers (also referred to herein as "DCs"). The items may be shipped in one or more assortment packs, each of which represents one or more physical packages (e.g., boxes) that include the ordered items. The retail chain may also specify the contents of each assortment pack based on forecasted sales of the product at the retail stores and forecasted sales of the product online.

By ordering products from a vendor using assortment packs, the retail chain may help to decrease the cost of shipping the products to the individual retail stores and to the DCs. For instance, because each shipping transaction may incur separate fees, it may be more cost effective to ship one assortment pack that includes a larger quantity of products to each individual retail store than to ship multiple, smaller packages. In addition, by designating the contents of the assortment packs based on forecasted sales of the product for which the products are expected to be in high demand (e.g., a summer season for clothes typically worn during the summer, such as shorts, t-shirts, baseball caps, and the like), the retail chain may help to minimize the number of unsold products at the retail store or at the online DC as well as any deficiency in the number of products that may result in lost sales opportunities of the products.

The forecasted sales of an item, as well as the forecasted sales of different versions of the item (e.g., sizes, colors, styles etc.) may differ between individual retail stores of the retail chain. Also, online demand is typically much greater than demand for each individual retail store alone. As such, the forecasted distribution of products (e.g., a number of large, medium, and small sizes of a particular article of clothing) may differ among individual retail stores, and may further differ for the DCs. For instance, a retail store located in California may forecast a larger number of sales of a small size of a particular shirt than a retail store in Minnesota. Similarly, a retail store in Maine may forecast a smaller number of sales of a particular style of pant than a retail store in Arizona. Because the online store may draw customers from across the country or around the world, the forecast for the online demand may again be much different than for individual retail store alone. As such, the distribution of different versions of a product included in an assortment pack sent to one retail store may differ from the distribution of the different versions of the product included in an assortment pack sent to another retail store, and will further differ from the versions of the product required by the DCs. In addition, because online demand may be much higher than that for any individual retail store, the online demand may not be met by a single assortment pack.

Techniques described herein may enable a retail chain to designate the contents of one or more optimized DC assortment packs for online distribution centers based on a plurality of assortment packs defined for the retail stores ("store assortment packs"). The plurality of store assortment packs each includes a different distribution of a first set of items offered for sale at the retail stores. For example, if there are N store assortment packs, each of the N store assortment packs contains a unique distribution of items that is different than the distribution of items in the other store assortment packs. In one example, each retail store is associated with one of the plurality of store assortment packs such that the forecasted demand at each retail store is met by the contents of the associated store assortment pack. The retail stores associated with the same one of the plurality of store assortment packs are referred to as a "cluster" of retail stores.

Each store assortment pack has a known capacity. The capacity may be defined in any of a variety of ways. For example, the capacity may define a maximum number of items that will fit into the assortment pack; the capacity may define a maximum volume of the assortment pack, or any other means of measuring/defining capacity of an assortment pack. The capacity of the assortment packs is one factor that may be taken into account during assortment pack planning for the store assortment packs. However, at least some of the store assortment packs may have excess capacity once the distribution of items for each of the store assortment packs have been determined.

Because the item distribution in store assortment packs is reflective of the demand for the items at the retail stores, store assortment packs may be a good starting point for creating assortment packs for online distribution centers. In the examples described herein, therefore, the optimized DC assortment packs are determined based on a plurality of pre-defined store assortment packs. According to various techniques of this disclosure, a computing device may identify a first set of items required by an online DC that can be fulfilled using one or more of the store assortment packs. This first set of items includes items that are offered for sale at both the traditional brick-and-mortar retail store locations and also via the e-commerce or online store. The computing device may then select a group of store assortment packs that fulfill the requirements of the online DC for the first set of items. For example, the selected group of store assortment packs may include 0, 1, or more of each type of store assortment pack, depending on the DC forecasted sales for each item and how many of each item are in each of the store assortment packs.

The computing device may further identify a second set of items required by the online DC that cannot be fulfilled using one or more store assortment packs. This second set of items includes items that are not offered at the traditional brick-and-mortal retail stores, such as "online only" items, and are therefore not included in any of the store assortment packs.

The computing device may further calculate the capacity of each of the selected group of store assortment packs, and determine whether or not the second set of items (e.g., "online only" items) will fit within the excess capacity of the selected group of store assortment packs. If so, the computing device may further solve for an optimal DC assortment pack configuration (that is, the distribution of items within the assortment packs). In other words, the computing device may rearrange the distribution of items in the selected group of store assortment packs to arrive at an optimized set of DC assortment packs. In some examples, the optimized set of DC assortment packs includes the same total number of packs and the same quantity of each item as the selected group of store assortment packs, but includes a different distribution of the items among the same number of packs.

In the event that the second set of items does not fit within the excess capacity of the selected group of store assortment packs, the computing device may select a new group of store assortment packs that fulfill the DC requirements for the first set of items, where the number of the selected group of store assortment packs is decreased by one. In addition, the number of "DC only" assortment packs is increased by one. A "DC only" assortment pack is an initially empty assortment pack added for purposes of fitting any of the second set of items that do not fit into the selected group of store assortment packs. In the first iteration, the number of DC only assortment packs is set to zero. However, when the computing device determines that that not all of the second set of items can be fit into the excess capacity of the first selected group of store assortment packs, the selected number of store assortment packs is decreased by one and the number of DC assortment packs is increased by one. If the second set of items still do not fit after addition of the first DC only assortment pack, the process continues, decreasing the selected group of store assortment packs by one and increasing the number of DC only assortment packs by one, until all of the online only items fit into the selected group of store assortment packs and any added DC only assortment packs.

FIG. 1 is a conceptual diagram illustrating an example retail environment, including a plurality of retail stores 2A-2N (collectively referred to herein as "retail stores 2") and an online distribution center 16, in which the assortment pack planning techniques of the present disclosure may be used. FIG. 1 shows a plurality of store assortment packs 4A-4N (collectively referred to herein as "assortment packs 4") distributed by a vendor 6 to the plurality of retail stores 2A-2N. Each of store assortment packs 4A-4N includes a unique distribution of versions of an item offered for sale at the plurality of retail stores 2A-2N. For example, store assortment pack 4A may include one distribution of large, medium, and small sizes of a certain style of shirt, while assortment pack 4B includes a different distribution of large, medium, and small sizes of the same style of shirt (e.g., a different number of one or more of the large, medium, and small sizes).

In the example of FIG. 1, each retail store 2A-2N is associated with one of the plurality of store assortment packs 4A-4N such that the forecasted demand at each retail store is met by the contents of the associated store assortment pack. In this example, retail stores 2A and 2B are associated with store assortment pack 4A, retail stores 2C-2E are associated with store assortment pack 2B, and retail store 2N is associated with store assortment pack 4N. The retail stores associated with the same one of the plurality of store assortment packs are referred to as a "cluster" of retail stores. Thus, in this example, retail stores 2A and 2B are associated with store assortment pack 4A, thus forming a cluster of retail stores 8A (and thus there are two retail stores in cluster 8A); retail stores 2C-2E are associated with store assortment pack 2B, thus forming a cluster of retail stores 8B (and thus there are three retail stores in cluster 8B); and retail store 2N is associated with store assortment pack 4N, thus forming a cluster of retail stores 8N (and thus there is one store in cluster 8N).

To fulfill forecasted demand for the online distribution center 16, the techniques of the present disclosure includes determining a group of optimized DC assortment packs 14 based on the plurality of store assortment packs 4A-4N. According to various techniques of this disclosure, a computing device may identify a first set of items required by an online DC 16 that can be fulfilled using one or more of the store assortment packs 4A-4N. This first set of items includes items that are offered for sale at both the traditional brick-and-mortar retail store locations 2A-2N and also via an e-commerce site, such as online store or website from which customers may purchase items. The demand of the online store is fulfilled using inventory at one or more online DCs 16. The computing device may then select a group of store assortment packs 10 that fulfill the requirements of the online DC 16 for the first set of items. For example, the selected group of store assortment packs 10 may include 0, 1, or more of each type of store assortment pack, depending on the DC forecasted sales for each item and how many of each item are in each of the store assortment packs 4A-4N. In the example of FIG. 1, the selected group of store assortment packs 10 may include any integer number, 0-N, of each store assortment pack 4A-4N. For example, the selected group of store assortment packs 10 may include 2 of store assortment pack 4A, 0 of store assortment pack 4B, 5 of store assortment pack 4N, etc.

The computing device may further identify a second set of items required by the online DC that cannot be fulfilled using one or more store assortment packs 4A-4N. This second set of items includes items that are not offered at the traditional brick-and-mortal retail stores 2A-2N, such as "online only" items, and are therefore not included in any of the store assortment packs 4A-4N.

The computing device may further calculate the capacity of each of the selected store assortment packs 10, and determine whether or not the second set of items (e.g., "online only" items) will fit within the excess capacity of the selected group of store assortment packs 10. If so, the computing device may further solve for an optimized set of DC assortment packs 14 (that is, an optimal distribution of items within the DC assortment packs). In other words, the computing device may rearrange the distribution of items in the selected group of store assortment packs 10 to arrive at an optimized set of DC assortment packs 14. In some examples, the optimized set of DC assortment packs 14 includes the same total number of packs and the same quantity of each item as the selected group of store assortment packs 10, but includes a different distribution of the items among the same number of packs.

In the event that the second set of items does not fit within the excess capacity of the selected group of store assortment packs 10, the computing device may select a new group of store assortment packs that fulfill the DC requirements for the first set of items, where the number of packs in the selected group of store assortment packs 10 is decreased by one. In addition, the number of "DC only" assortment packs 12 is increased by one. As described above, a "DC only" assortment pack 12 is an initially empty assortment pack added for purposes of fitting any of the second set of items that do not fit into the excess capacity of the selected group of store assortment packs 10. In the first iteration, the number of DC only assortment packs 12 is set to 1. However, when the computing device determines that that not all of the second set of items can be fit into the excess capacity of the first selected group of store assortment packs 10, the selected number of store assortment packs is decreased by one and the number of DC assortment packs 12 is increased by one. If the second set of items still do not fit after addition of the first DC only assortment pack 5, the process continues, decreasing the number of packs in the selected group of store assortment packs 10 by one and increasing the number of DC only assortment packs 12 by one, until all of the online only items fit into the selected group of store assortment packs 10 and any added DC only assortment packs 5. This final selected group of store assortment packs 10 and DC only assortment packs 12 are then optimized to create the set of optimized DC assortment packs 14, which are then forwarded to the online distribution center 16.

Figure 2:
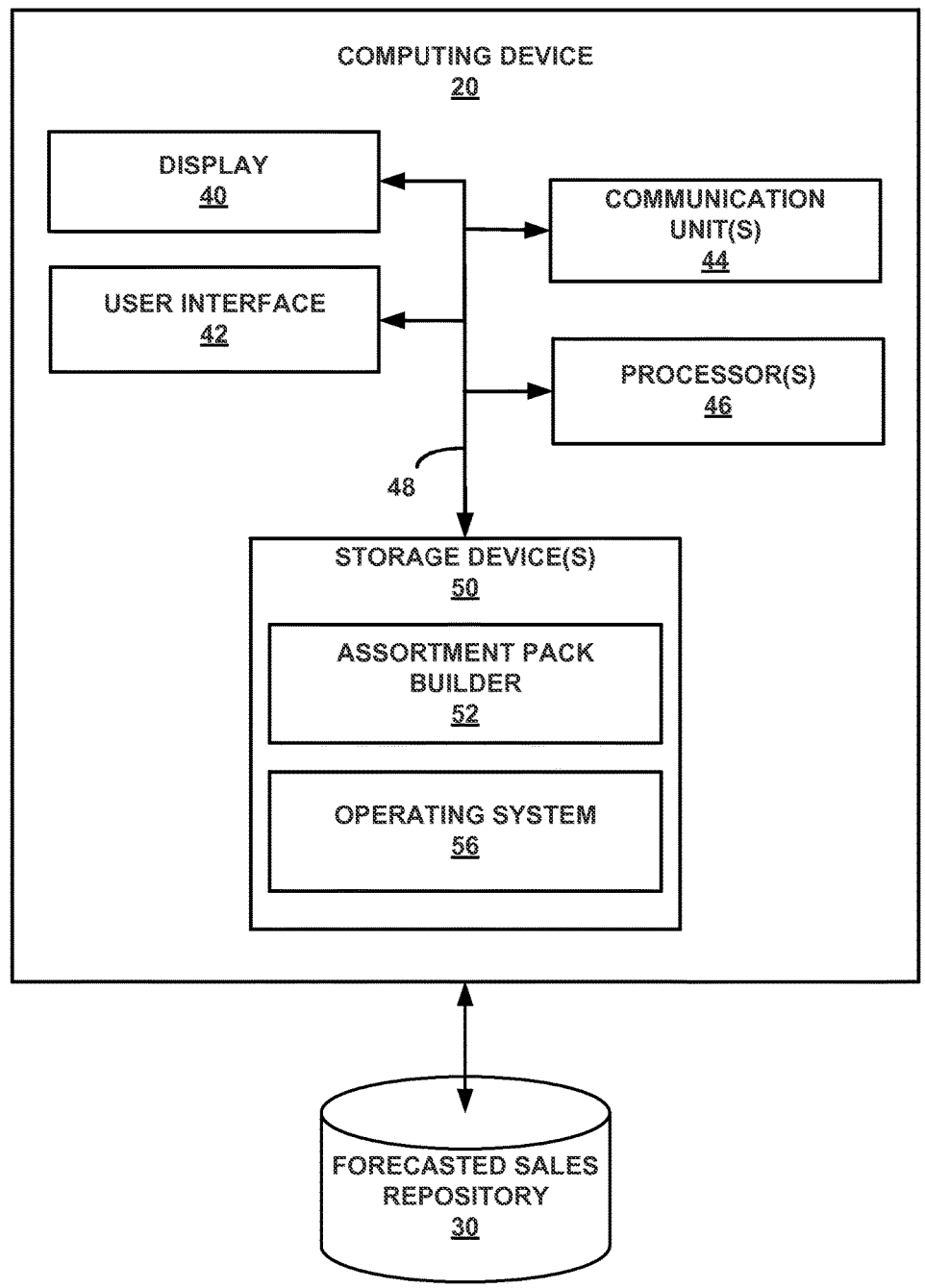
FIG. 2 is a block diagram illustrating an example computing device that may be used to execute the assortment planning techniques of the present disclosure.

FIG. 2 is a block diagram illustrating an example computing device 20 that may be used to execute the assortment planning techniques of the present disclosure. Examples of computing device 20 may include, but are not limited to, computing devices such as desktop computers, workstations, network terminals, and portable or mobile devices such as personal digital assistants (PDAs), mobile phones (including smart phones), tablet computers, laptop computers, netbooks, ultrabooks, and others.

Example computing device 20 includes a display 40, a user interface 42, one or more communication units 44, one or more processors 46, and one or more storage devices 50 which communicate with one another using one or more communication channels 48. Storage devices 50 further includes an assortment pack builder module 52 and an operating system 56. Communication channels 48 may include, for example, a system bus, network connection, inter-process communication data structure, or any other channel for communicating data.

Display 40 may be a liquid crystal display (LCD), e-ink, organic light emitting diode (OLED), touch screen, or any other display. Display 40 may present the content of computing device 20 to a user. For example, display 40 may display the output of assortment pack builder 16 executed on one or more processors 46 of computing device 20, confirmation messages, indications, or other functions that may be presented to a user. In some examples, display 40 may provide some or all of the functionality of a user interface of computing device 20. For instance, display 40 may be a touch-sensitive and/or presence-sensitive display that can display a graphical user interface (GUI) and detect input from a user in the form of user input gestures using capacitive or inductive detection at or near the presence-sensitive display.

User interface 42 may allow a user of computing device 20 to interact with computing device 20. Examples of user interface 42 may include, but are not limited to, a keyboard or keypad, a mouse, a roller ball, buttons, stylus, touch screen, or other devices that allow a user to interact with computing device 20.

Computing device 20, in some examples, also includes one or more communication units 44 that facilitate communication with external devices via one or more networks, such as one or more wireless networks, one or more cellular networks, or other types of networks. One or more communication units 44 may be a network interface card, such as an Ethernet card, an optical transceiver, a radio frequency transceiver, or any other type of device that can send and receive information. Other examples of such network interfaces may include Bluetooth, 3G, and Wi-Fi radio computing devices as well as Universal Serial Bus (USB).

One or more processors 46 are configured to implement functionality and/or process instructions for execution within computing device 20. For example, one or more processors 46 may be capable of processing instructions stored at one or more storage devices 50. Examples of one or more processors 46 may include any one or more of a microprocessor, a controller, a digital signal processor (DSP), an application specific integrated circuit (ASIC), a field-programmable gate array (FPGA), or equivalent discrete or integrated logic circuitry.

Storage devices 50 may be configured to store information generated or used by computing device 20 during operation. Storage devices 50, in some examples, may be described as a computer-readable storage medium, and may be used to store program instructions for execution by one or more processors 46.

Storage devices 50 may include, for example, an assortment pack builder module 52 and an operating system 56. Operating system 56, when executed by processors 46, may control the operation of components of computing device 20.

Assortment pack builder 52 may include any software or hardware process configured for executing various techniques described herein. For example, assortment pack builder 52 may include one or more computer-executable instructions stored at one or more computer-readable storage devices and executable by one or more processors 46 of computing device 20. In some examples, one or more of the functions of assortment pack builder 52 may be included in hardware components, such as one or more processors, digital signal processors (DSP), application specific integrated circuits (ASIC), or other discrete or integrated logic circuitry. Similarly, although illustrated with respect to one computing device for ease of discussion, in certain examples, one or more of the functions of computing device 20 and/or assortment pack builder 52 may be distributed among multiple computing devices. For instance, one or more of the functions of computing device 20 and/or assortment pack builder 52 may be distributed among multiple workstations, desktop computers, laptop computers, and the like.

Forecasted sales repository 30 may include, for example, one or more databases, such as relational databases, multidimensional databases, hierarchical databases, object-oriented databases, or one or more other types of databases. Forecasted sales repository 30 may be part of computing device 20, one or more other computing devices remote from computing device 20 or distributed among computing device 20 and one or more remote computing devices. In certain examples, forecasted sales repository 30 may compute and/or store the sales forecasts for one or more items offered for sale at one or more retail stores, and/or may store sales forecasts items offered for sale on an online store or e-commerce site. In general, forecasted sales repository 30 may include any software and/or hardware process and any organizational structure that enables computing device 20 to determine forecasted sales of one or more items at one or more of retail stores or for an online store and fulfilled by an online distribution center, such as retail stores 2A-2N or online distribution center 16 of FIG. 1.

Assortment pack builder 52 may access forecasted sales repository 30 to determine the forecasted sales for items offered at the plurality of retail stores and also to determine the forecasted sales of items offered at the online store and fulfilled by the online distribution center. Assortment pack builder 16 may determine a set of optimized DC assortment packs, such as optimized DC assortment packs 14 as shown in FIG. 1, based at least in part on the forecasted sales of the items for the online distribution center and on the contents of the pre-defined store assortment packs, such as store assortment packs 4A-4N of FIG. 1.

Computing device 20 may further include additional components not shown in FIG. 2 for clarity. For example, computing device 20 may include a battery to provide power to the components of computing device 20. Similarly, the components of computing device 20 may not be necessary in every example of computing device 20. For instance, in certain examples computing device 20 may not include display 40. Those skilled in the art will readily understand that computing device 20 may be implemented in a variety of ways, and that the disclosure is not limited in this respect.

Figure 3:
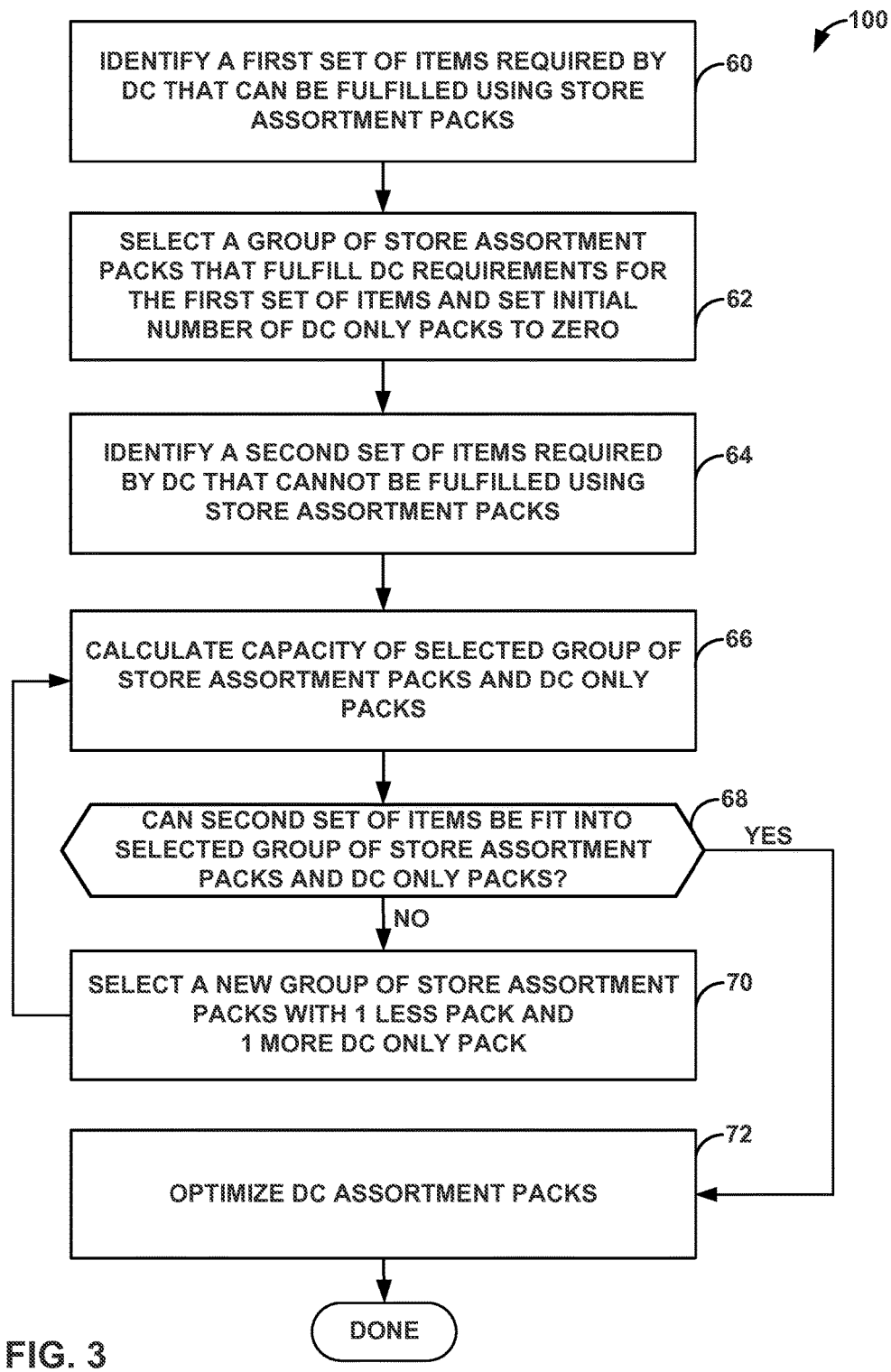
FIG. 3 is a flow diagram illustrating an example process by which a computing device may execute the assortment planning techniques of the present disclosure.

FIG. 3 is a flow diagram illustrating an example process (100) by which a computing device may execute the assortment planning techniques of the present disclosure. Example process (100) allows the computing device to determine the contents of one or more optimized DC assortment packs for online distribution centers based on a plurality of pre-defined store assortment packs. The plurality of store assortment packs each includes a unique distribution of items offered for sale at the plurality of retail stores. For example, if there are N store assortment packs, each of the N store assortment packs contains a unique distribution of items that is different than the distribution of items in the other store assortment packs. As described above, for example, each retail store may be associated with one of the plurality of store assortment packs such that the forecasted demand at each retail store is met by the contents of the associated store assortment pack. The retail stores associated with the same one of the plurality of store assortment packs are referred to as a "cluster" of retail stores.

Through execution of process (100), computing device may determine a group of optimized DC assortment packs based on the plurality of pre-defined store assortment packs. For example, computing device may identify a first set of items required by an online DC that can be fulfilled using one or more of the store assortment packs (60). This first set of items includes items that are offered for sale at both the traditional brick-and-mortar retail store locations and also via the e-commerce or online store. The computing device may then select a group of store assortment packs that fulfill the requirements of the online DC for the first set of items (62). For example, the selected group of store assortment packs may include 0, 1, or more (i.e., any integer greater than or equal to 0) of each type of store assortment pack, depending on the DC forecasted sales for each item and how many of each item are in each of the store assortment packs.

The computing device may further identify a second set of items required by the online DC that cannot be fulfilled using one or more store assortment packs (64). This second set of items includes items that are not offered at the traditional brick-and-mortal retail stores, such as "online only" items, and are therefore not included in any of the store assortment packs.

The computing device may further calculate the capacity of each of the selected group of store assortment packs (66), and determine whether or not the second set of items (e.g., "online only" items) will fit within the excess capacity of the selected group of store assortment packs (68). Each store assortment pack has a known capacity, which may be defined in any of a variety of ways. For example, the capacity may define a maximum number of items that will fit into the assortment pack; the capacity may define a maximum volume of the assortment pack, or any other means of measuring/defining capacity of an assortment pack. At least some of the store assortment packs may have excess capacity once the distribution of items for each of the store assortment packs have been determined.

To determine whether or not the second set of items will fit within the capacity of the selected group of store assortment packs (68), the computing device may, for example, determine whether there is excess capacity in each of the selected group of store assortment packs. For example, the computing device may subtract the number of items assigned to an assortment pack from the maximum number of items defined for that assortment pack. If the difference is greater than zero, the difference is indicative of the number of additional items from the second set of items that may be fit into the excess capacity of that store assortment pack. This process may be repeated for each of the selected group of store assortment packs, and the computing device may then determine whether the second set of items will fit within the excess capacity of the selected group of store assortment packs.

Although an example where capacity was defined as a maximum item number was described, it shall be understood that capacity can be measured in many other ways (e.g., volume, weight, dimensions, etc.), and that the disclosure is not limited in this respect.

If the second set of items will fit within the excess capacity of the selected group of store assortment packs (68), the computing device may further solve for an optimal DC assortment pack configuration (that is, the distribution of items within the assortment packs) (72). In other words, the computing device may rearrange the distribution of items in the selected group of store assortment packs to arrive at an optimized set of DC assortment packs. In some examples, the optimized set of DC assortment packs includes the same total number of packs and the same quantity of each item as the selected group of store assortment packs, but includes a different distribution of the items among the same number of packs.

In the event that the second set of items does not fit within the excess capacity of the selected group of store assortment packs (68), the computing device may select a new group of store assortment packs that fulfill the DC requirements for the first set of items, where the number of the selected group of store assortment packs is decreased by one. In addition, the number of "DC only" assortment packs is increased by one (70). As described above, a "DC only" assortment pack is an initially empty assortment pack added for purposes of fitting any of the second set of items that do not fit into the selected group of store assortment packs. In the first iteration, the number of DC only assortment packs is set to zero. However, when the computing device determines that not all of the second set of items can be fit into the excess capacity of the initially selected group of store assortment packs, the selected number of store assortment packs is decreased by one and the number of DC assortment packs is increased by one. If the second set of items still do not fit after addition of the first DC only assortment pack, the process repeats (66), (68), (70), decreasing the selected group of store assortment packs by one and increasing the number of DC only assortment packs by one, until all of the online only items fit into the selected group of store assortment packs and any added DC only assortment packs.

Once the second set of items will fit within the excess capacity of the selected group of store assortment packs and the group of DC only assortment packs (68), the computing device optimizes the distribution of items within the assortment packs (72). In other words, the computing device may rearrange the distribution of items in the selected group of store assortment packs and the group of DC only assortment packs to arrive at an optimized set of DC assortment packs (72). In some examples, the optimized set of DC assortment packs includes the same total number of packs and the same quantity of each item as the selected group of store assortment packs and DC only assortment packs, but includes a different distribution of the items among the same number of packs.

Figure 4:
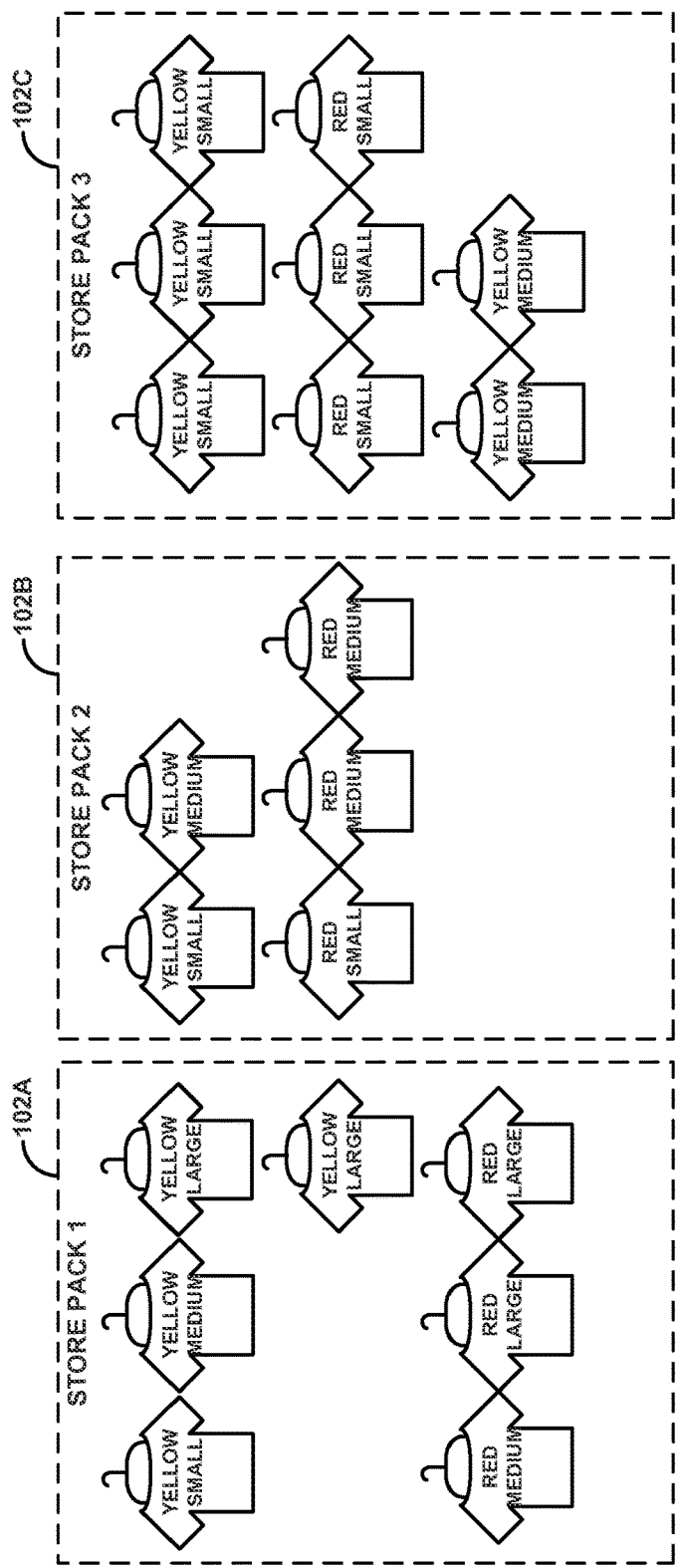
FIGS. 4-7 are conceptual diagrams illustrating one example of assortment planning techniques of the present disclosure.

FIGS. 4-7 are conceptual diagrams illustrating a simplified example of the online distribution assortment planning techniques of the present disclosure. FIG. 4 shows example pre-defined store assortment packs 102A, 102B, and 102C. In this example, store assortment pack 102A includes 1 Small yellow shirt, 1 yellow Medium shirt, 2 Large yellow shirts, 1 Medium red shirt, and 2 Large red shirts. Store assortment pack 102B includes 1 Small yellow shirt, 1 Medium yellow shirt, 1 Small red shirt, and 2 Medium red shirts. Store assortment pack 102C includes 3 Small yellow shirts, 3 Small red shirts, and 2 Medium yellow shirts.

Figure 5:
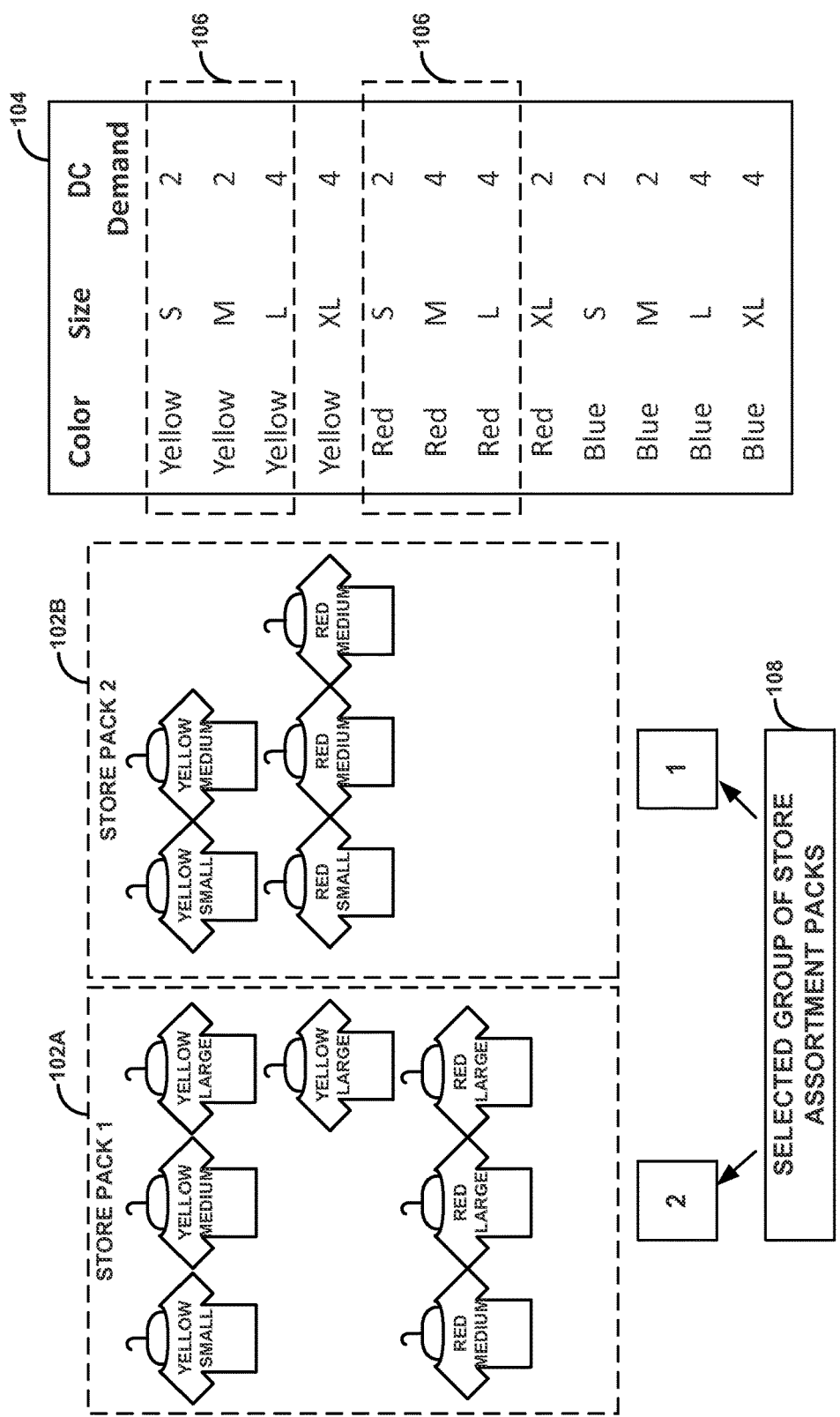

FIG. 5 shows a table 104 listing the forecasted demand for various colors and sizes of a certain style of shirt at an online distribution center. The first column lists the colors, the second column lists the sizes in each color, and the third column lists the DC forecasted demand for each listed color and size. In this example, items 106 are items that are offered for sale at the plurality of retail stores and are also offered for sale at the online store. Thus, in this example, this first set of items 106 includes yellow shirts in size Small, Medium, and Large, and red shirts in sizes Small, Medium, and Large. The initially selected group of store assortment packs 108 that fulfill the DC requirements for the first set of items includes 2 of store assortment pack 102A and 1 of assortment pack 102B. None of assortment pack 102C was included in the initially selected group in this example.

Figure 6:
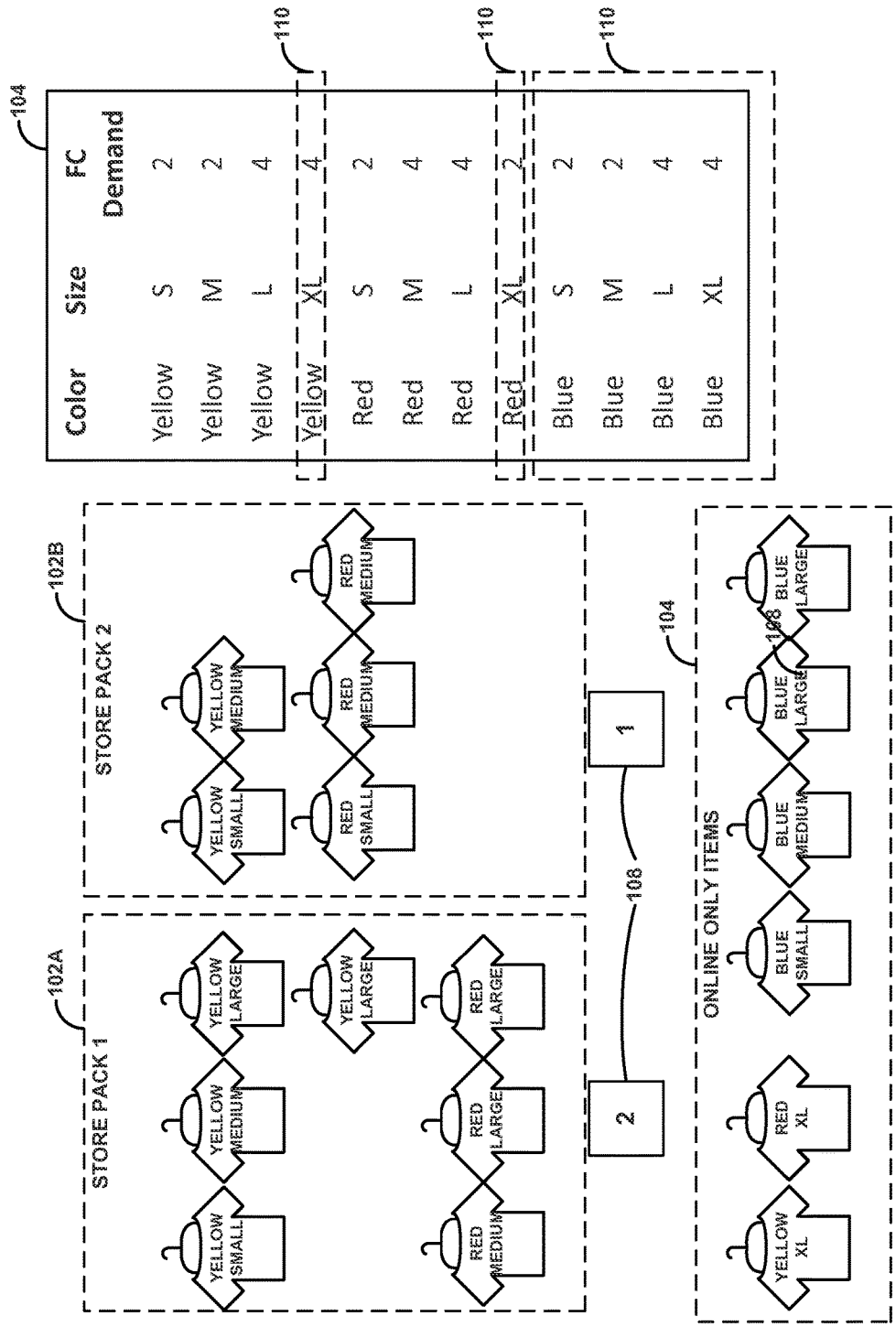

FIG. 6 again includes the table 104 listing the forecasted demand at the distribution center. FIG. 6 also indicates a second set of items 104 and their quantities 110 required by the online DC that cannot be fulfilled using one or more store assortment packs. This second set of items 110 includes items that are not offered at the traditional brick-and-mortar retail stores, such as "online only" items, and are therefore not included in any of the store assortment packs 102A and 102B (or 102C for that matter). In this example, the online only items 110 include yellow and red shirts in size Extra Large (XL) and blue shirts in sizes Small, Medium, Large, and XL.

Figure 7:
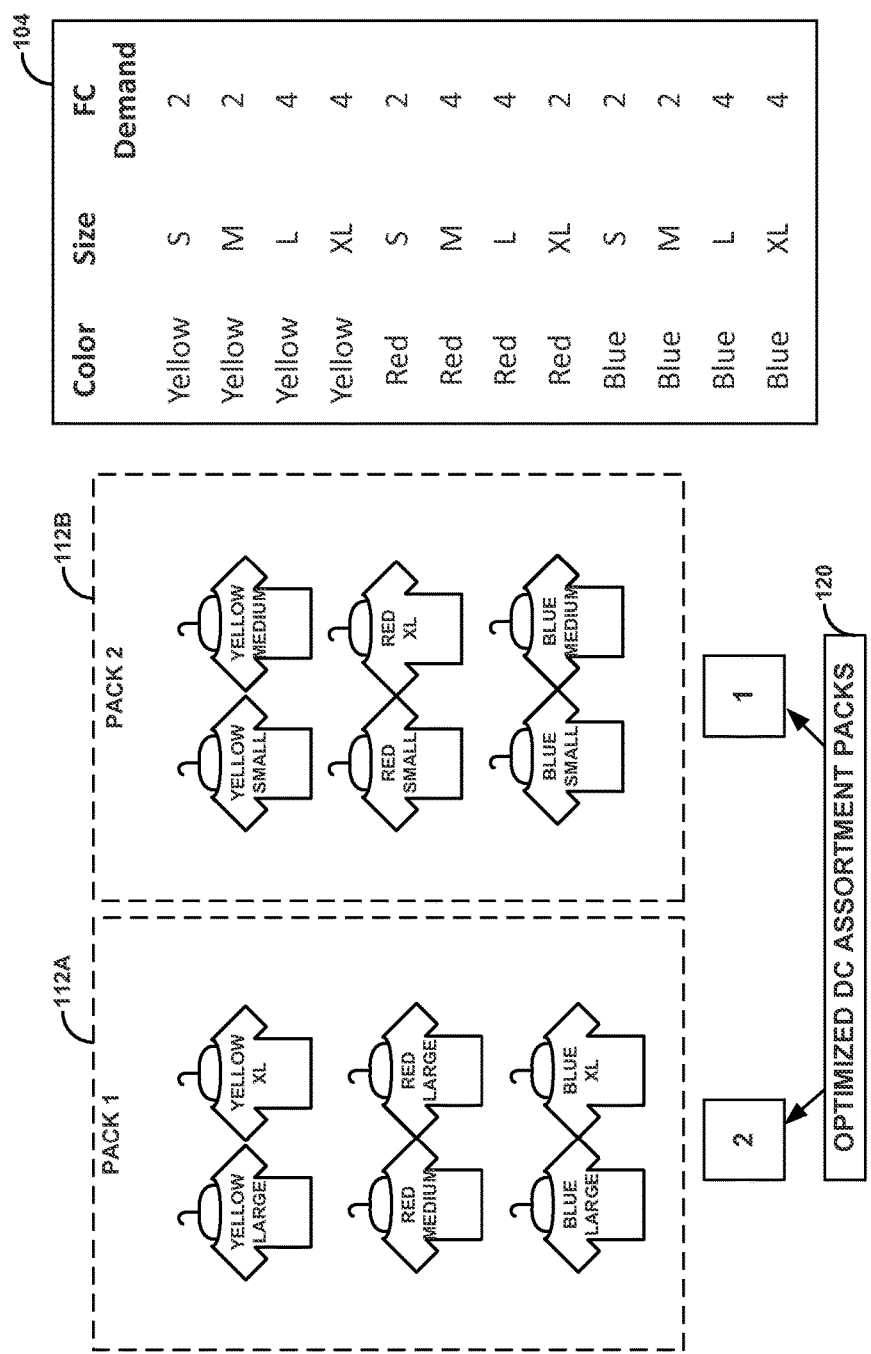

The computing device may further calculate the capacity of each of the selected group of store assortment packs 108, and determine whether or not the second set of items 110 will fit within the excess capacity of the selected group of store assortment packs 108. In the example of FIGS. 4-7, it is assumed that the second set of items 110 can be fit into the capacity of the selected group of store assortment packs. Thus, in this example, the computing device may next solve for an optimized set of DC assortment packs 112A and 112B as shown in FIG. 7. In this example, the computing device redistributed the first set of items 106 in the selected group of store assortment packs 108 and the second set of online only items 110 that was fit into the excess capacity of the selected group of store assortment packs to arrive at an optimized set of DC assortment packs 120. The optimized set of DC assortment packs 120 includes 2 of optimized assortment pack 112A and 1 of optimized assortment pack 112B. Note that in this example the optimized set of DC assortment packs 120 includes the same total number (3) of assortment packs as the selected group of store assortment packs 108 (as shown in FIGS. 5 and 6), but includes a different distribution of the items among the same number of assortment packs.

As described above, in the example of FIGS. 4-7, it was assumed that the second set of items 110 could be fit into the capacity of the selected group of store assortment packs 108. In the event that the second set of items did not fit within the excess capacity of the selected group of store assortment packs 108, the computing device may continue to execute the process such as that shown in FIG. 3. As described above, the computing device may select a new group of store assortment packs that fulfill the DC requirements for the first set of items, where the number of packs in the selected group of store assortment packs is decreased by one, while the number of "DC only" assortment packs is increased by one. As described above, a "DC only" assortment pack is an initially empty assortment pack added for purposes of fitting any of the second set of items that do not fit into the excess capacity of the selected group of store assortment packs. This process is repeated, decreasing the number of packs in the selected group of store assortment packs by one and increasing the number of DC only assortment packs by one, until all of the online only items fit into the selected group of store assortment packs and any added DC only assortment packs. This final selected group of store assortment packs and DC only assortment packs are then optimized to create the set of optimized DC assortment packs, which are then forwarded to the online distribution center.

Although illustrated with respect to a distribution of different versions of a single item (e.g., a distribution of different colors and sizes of a shirt in this example), it should be understood that techniques of this disclosure are not so limited. For example, one or more of store assortment packs and/or optimized DC assortment packs may include distributions of multiple different items, such as shirts, pants, towels, tennis rackets, and the like.

During optimization of the DC assortment packs, such as (72) as shown in the example process (100) of FIG. 3, assortment pack builder 52 may take several factors into account. For example, assortment pack builder may require that each optimized DC assortment pack contains less than or equal the maximum number of items (or other means of measuring capacity) that may be included in an assortment pack. As another example, assortment pack builder may require that each optimized DC assortment pack contains a minimum number of items. As another example, assortment pack builder may attempt to constrain the number of items in each optimized DC assortment pack so as to minimize the difference between the numbers of items in each assortment pack. In other words, assortment pack builder may attempt, to the extent possible, to place the same number of items in each of the optimized DC assortment packs.

As another example, assortment pack builder 52 may determine the distribution of the different versions of the item included in an assortment pack based on a maximum number of assortment packs. In certain examples, it may be impractical to physically assemble and deliver a number of assortment packs that exceeds a threshold value. For instance, it may not be cost-effective to assemble more than a threshold number of assortment packs (e.g., more than twenty assortment packs, or whatever number of assortment packs is determined to be the maximum threshold number of assortment packs). As such, assortment pack builder 52 may, in certain examples, determine the distribution of the different versions of the item included in a group of optimized DC assortment packs based on a maximum number of optimized DC assortment packs.

As another example, assortment pack builder 52 may optimize the distribution of items included in an assortment pack based on a cost of overstocking the items and a cost of understocking the items at the distribution center. Overstocking an item may be considered including a quantity of the item in an optimized DC assortment pack that exceeds the forecasted DC demand of the item. A cost of overstocking an item, for example, may be based on a monetary cost that results from a failure to sell the item within the forecasted period of time. Similarly, understocking an item may be considered including a quantity of the item in an assortment pack that is less than the forecasted DC demand of the item. A cost of understocking an item, for example, may be based on a lost opportunity to generate a predicted monetary gain from a sale of the understocked item.

A more detailed example solution for creating optimized DC assortment packs based on pre-defined store assortment packs will now be presented. Although a specific example solution is shown and described, it shall be understood that the techniques described herein may also be implemented using other specific example calculations, and that the disclosure is not limited in this respect.

In this example, assume there is a limited quantity of case packs available to send to the online distribution center, known as the maximum number of DC assortment packs. The example optimization solution attempts to build the DC assortment packs with as few case packs as possible and build up to the maximum number of DC assortment packs if needed.

The example solution may use store assortment packs as a proxy for DC assortment packs. For example, the solution may select a group of store assortment packs that fulfill the DC requirements for the first set of items (item sold at both the retail stores and the online store), such as shown and described with respect to step (62) of FIG. 3. The purpose of this step is to determine about how many different packs and how many of each type of store assortment pack are needed as a starting point.

The following is an example optimization problem that may be solved in this step. This results in the number of store assortment packs needed to meet the online demand for items that sell in both retail stores and online, i.e., the selected group of store assortment packs.

Data:
i∈I=Set of Items
j∈J=Set of DCs
k∈K=Set of Packs
$d_{ij}$=Demand of item i at $DC_j$
$c_{jk}$=Quantity of item i in Pack k (set of store packs)
$s_{ij}$=Safety Stock of each item to send to each DC
C=Pack Capacity
N=Number of unique DC packs allowed
Variables:
$x_k$=Indicator variable of whether pack k is used or not
$y_{kj}$=Number of packs k to send to DC,
Problem Formulation:
minimize $$\sum_j \sum_i \sum_k |c_{ik} y_{kj} - d_{ij}| \quad (1)$$

$$\text{s.t.} \sum_j y_{kj} \leq M x_k \ \forall \, k \quad (2)$$

-continued $$\sum_k x_k \leq N \quad (3)$$

$$\sum_k c_{ik} y_{kj} \geq \max(1, s_{ij}) \ \forall \, i, j \quad (4)$$

$$\sum_k y_{kj} \geq 1 \ \forall \, j \quad (5)$$

$$y_{kj} \geq 0, \text{integer} \ \forall \, k, j \quad (6)$$

$x_k \geq 0$, binary $\forall \, k$

In equation (1), the goal of the problem is to minimize the sum of the deviations between the quantity of each item sent and the demand for each item at the DC. Equation (2) is a constraint to ensure that pack k receives items only if pack k is used. M symbolizes a very large number in this example. Equation (3) ensures that only N unique store packs are used to send to the DCs. Equation (4) ensures that at least the Safety Stock for each item is sent to all DCs. Equation (5) ensures that at least one pack is sent to each DC. Equations (6) are on-negativity constraints.

The example solution may next determine whether additional DC assortment packs are needed for online only items. For example, the solution may identify a second set of items required by the DC that cannot be fulfilled using store assortment packs, attempt to fit the second group of items into any excess capacity of the store assortment packs, and if the items do not fit, add additional DC only assortment packs until the second set of items can be fit within the currently selected group of store assortment packs and DC only assortment packs (see, e.g., steps (64), (66), and (68) of FIG. 3 and corresponding description).

The solution may determine whether the minimum number of required units for the second set of items (e.g., "online only" items) can fit into the selected group of store assortment packs determined in the example optimization problem set forth above. If the units can fit, the algorithm optimizes the resulting group of packs to result in the final group of optimized of DC assortment packs (described in more detail below).

If the units do not fit and the maximum number of DC assortment packs (N) is not met, the number of store assortment packs is decreased by one, the number of DC only assortment packs increased by one, and the process is repeated until the items can be fit (e.g., as shown in FIG. 3).

If the units do not fit and the maximum number of online DC packs is met, the solution from step 1 is used for (max # of Online DC packs −1). The remaining pack is used for online only items. The online only item demand is split proportionally to fit the case pack capacity.

Once the selected group of store assortment packs and DC only assortment packs is determined, the solution may optimize the item composition among the packs. Because the number of packs remains the same, but the content changes, the optimization problem below will either find a better solution than the contents of the store assortment packs give and return that solution, or will give the solution with the contents unchanged. This may help to improve on the solution from the previous step.

Data:
i∈I=Set of Items
j∈J=Set of FCs
k∈K=Set of Packs
$d_{ij}$=Demand of item i at $FC_j$
$n_{jk}$=Number of packs of k sent to FCj $s_{ij}$=Safety Stock of each item to send to each FC
C=Pack Capacity
Variables:
$z_{ik}$=Quantity of item i to place in pack k
Problem Formulation:
minimize $$\sum_j \sum_i \sum_k |z_{ik} n_{kj} - d_{ij}| \quad (1)$$

$$\text{s.t.} \sum_i z_{ik} \leq C \ \forall \ k \quad (2)$$

$$\sum_k z_{ik} n_{kj} \geq \max(1, s_{ij}) \ \forall \ i, j \quad (3)$$

$$z_{ik} \geq 0, \text{ integer} \quad (4)$$

As shown by equation (1), the goal of the problem is to minimize the sum of the deviations between the amount sent and the demand for each item at the DC. Equation (2) ensures that the items and number of items assigned in each pack cannot exceed the pack capacity. Equation (3) ensures that at least the maximum of 1 or Safety Stock is sent to each DC. Equation (4) is a non-negativity constraint.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Various examples have been described. These and other examples are within the scope of the following claims.

The invention claimed is:

1. A method comprising:
   storing, by a storage device, data regarding a plurality of pre-defined store assortment packs, each store assortment pack containing a unique distribution of items offered for sale at one or more retail stores;
   identifying, by a computing device, a first set of items required by an online distribution center that can be fulfilled using one or more of the store assortment packs;
   selecting, by the computing device, a group of the store assortment packs that fulfill the requirements of the online distribution center for the first set of items;
   identifying, by the computing device, a second set of items required by the online distribution center that cannot be fulfilled using one or more of the store assortment packs;
   determining, by the computing device, whether the second set of items can be fit into the selected group of store assortment packs;
   in response to determining that the second set of items can be fit into the selected group of store assortment packs:
      optimizing, by the computing device, the distribution of items within the selected group of store assortment packs to include the second set of items to arrive at a first an optimized set of distribution center assortment packs; and
      generating, by the computing device, a notification regarding the first optimized set of distribution center assortment packs; and
   in response to determining that the second set of items cannot be fit into the selected group of store assortment packs:
      decreasing, by the computing device, a number of store assortment packs by one, and selecting, by the computing device, a group of store assortment packs that fulfill the distribution center requirements for the first set of items based on the decreased number of store assortment packs;
      increasing, by the computing device, a number of distribution center only assortment packs by one;
      determining, by the computing device, whether the second set of items can be fit into the decreased number of selected store assortment packs and the increased number of distribution center only assortment packs and if so, optimizing, by the computing device, the distribution of items within the decreased number of selected store assortment packs and the increased number of distribution center only assortment packs to include the second set of items to arrive at a second optimized set of distribution center assortment packs; and
      generating, by the computing device, a notification regarding the second optimized set of distribution center assortment packs; and shipping the first optimized set of distribution center assortment packs to the online distribution center, or shipping the second optimized set of distribution center assortment packs to the online distribution center.

2. The method of claim 1, wherein the selected group of store assortment packs is an integer number of store assortment packs.

3. The method of claim 1, wherein the computing device selects the group of store assortment packs based on forecasted sales for each item at the distribution center and how many of each item are included in each of the store assortment packs.

4. The method of claim 1 further comprising calculating, by the computing device, the capacity of each of the selected group of store assortment packs.

5. The method of claim 1 wherein the first set of items includes items that are offered for sale at the one or more retail stores and at an online store.

6. The method of claim 1 wherein the second set of items includes items that are not offered for sale at the one or more retail stores and are therefore not included in any of the store assortment packs.

7. The method of claim 1 wherein each store assortment pack is associated with one or more of the retail stores.

8. The method of claim 1 wherein determining, by the computing device, whether the second set of items can be fit into the selected group of store assortment packs comprises comparing the total number of items in the second set of items and the total number of items in the selected group of store assortment packs with the maximum number of items that can be fit into the selected group of store assortment packs.

9. The method of claim 1 wherein the first optimized group of distribution center assortment packs includes a same number of packs as the selected group of store assortment packs.

10. The method of claim 1 wherein the first optimized group of distribution center assortment packs includes the same quantity of each of the items as is included in the selected group of store assortment packs, and having a different distribution of the items within the optimized group of distribution center assortment packs.

11. A computing system comprising:
at least one storage device that stores data regarding a plurality of pre-defined store assortment packs, each store assortment pack containing a unique distribution of items offered for sale at one or more retail stores; and
at least one processor configured to:
identify a first set of items required by an online distribution center that can be fulfilled using one or more of the store assortment packs;
select a group of the store assortment packs that fulfill the requirements of the online distribution center for the first set of items;
identify a second set of items required by the online distribution center that cannot be fulfilled using one or more of the store assortment packs;
determine whether the second set of items can be fit into the selected group of store assortment packs;
in response to determining that the second set of items can be fit into the selected group of store assortment packs:
optimize the distribution of items within the selected group of store assortment packs to include the second set of items to arrive at a first optimized set of distribution center assortment packs; and
generate a notification regarding the optimized set of distribution center assortment packs; and
in response to determining that the second set of items cannot be fit into the selected group of store assortment packs:
decrease a number of store assortment packs by one, and selecting, by the computing device, a group of store assortment packs that fulfill the distribution center requirements for the first set of items based on the decreased number of store assortment packs;
increase a number of distribution center only assortment packs by one;
determine whether the second set of items can be fit into the decreased number of selected store assortment packs and the increased number of distribution center only assortment packs and if so, optimizing, by the computing device, the distribution of items within the decreased number of selected store assortment packs and the increased number of distribution center only assortment packs to include the second set of items to arrive at a second optimized set of distribution center assortment packs; and ship the first optimized set of distribution center assortment packs to the online distribution center, or ship the second optimized set of distribution center assortment packs to the online distribution center.

12. The computing system of claim 11, wherein the one or more processors are configured to select the group of store assortment packs based on forecasted sales for each item at the distribution center and how many of each item are included in each of the store assortment packs.

13. The computing system of claim 11 wherein the first set of items includes items that are offered for sale at the one or more retail stores and at an online store, and wherein the second set of items includes items that are not offered for sale at the one or more retail stores and are therefore not included in any of the store assortment packs.

14. The computing system of claim 11 wherein the one or more processors are further configured to determine whether the second set of items can be fit into the selected group of store assortment packs by comparing the total number of items in the second set of items and the total number of items in the selected group of store assortment packs with the maximum number of items that can be fit into the selected group of store assortment packs.

15. The computing system of claim 11 wherein the optimized group of distribution center assortment packs includes a same number of packs as the selected group of store assortment packs, and wherein the optimized group of distribution center assortment packs includes the same quantity of each of the items as is included in the selected group of store assortment packs, and having a different distribution of the items within the first optimized group of distribution center assortment packs.

16. A non-transitory computer-readable storage medium storing instructions that, when executed, cause at least one processor of a computing device to:
identify a first set of items required by an online distribution center that can be fulfilled using one or more store assortment packs, each of the one or more store assortment packs containing a unique distribution of items offered for sale at one or more retail stores;
select a group of the store assortment packs that fulfill the requirements of the online distribution center for the first set of items;
identify a second set of items required by the online distribution center that cannot be fulfilled using one or more of the store assortment packs;
determine whether the second set of items can be fit into the selected group of store assortment packs;

in response to determining that the second set of items can be fit into the selected group of store assortment packs:
  optimize the distribution of items within the selected group of store assortment packs to include the second set of items to arrive at an optimized set of distribution center assortment packs; and
  generate a notification regarding the optimized set of distribution center assortment packs; and
in response to determining that the second set of items cannot be fit into the selected group of store assortment packs:
  decrease a number of store assortment packs by one, and selecting, by the computing device, a group of store assortment packs that fulfill the distribution center requirements for the first set of items based on the decreased number of store assortment packs;
  increase a number of distribution center only assortment packs by one;
  determine whether the second set of items can be fit into the decreased number of selected store assortment packs and the increased number of distribution center only assortment packs and if so, optimizing, by the computing device, the distribution of items within the decreased number of selected store assortment packs and the increased number of distribution center only assortment packs to include the second set of items to arrive at a second optimized set of distribution center assortment packs; and ship the first optimized set of distribution center assortment packs to the online distribution center, or ship the second optimized set of distribution center assortment packs to the online distribution center.

* * * * *